UNITED STATES PATENT OFFICE.

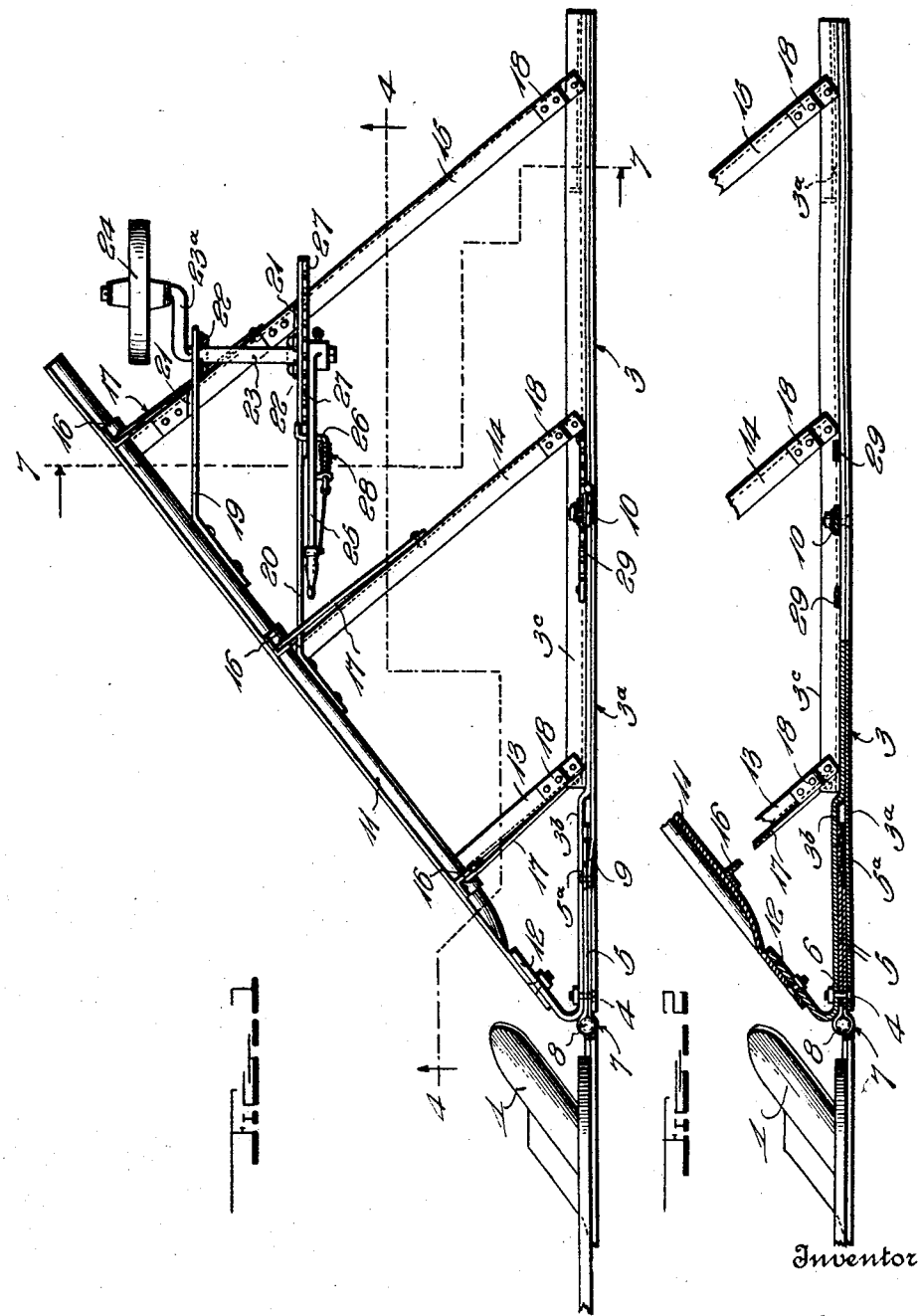

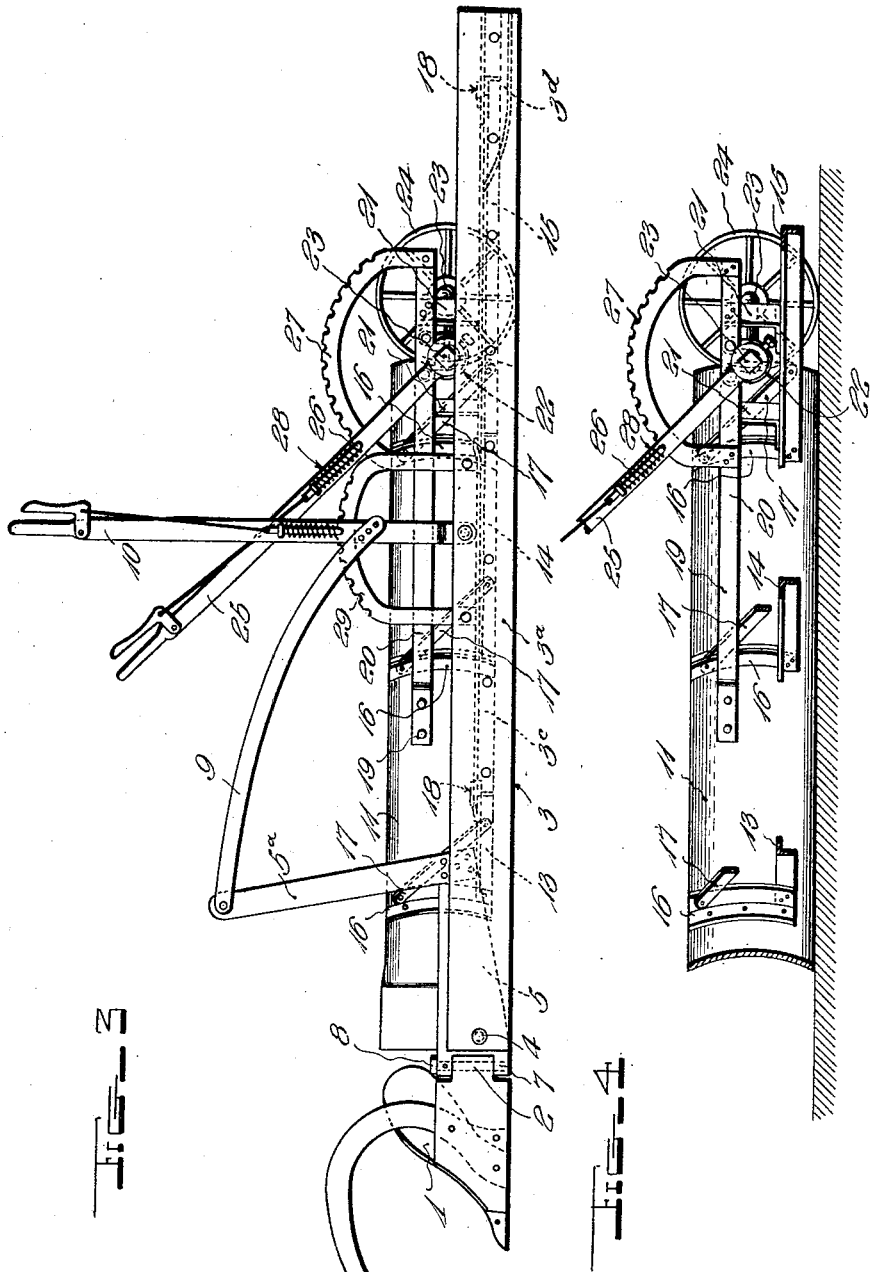

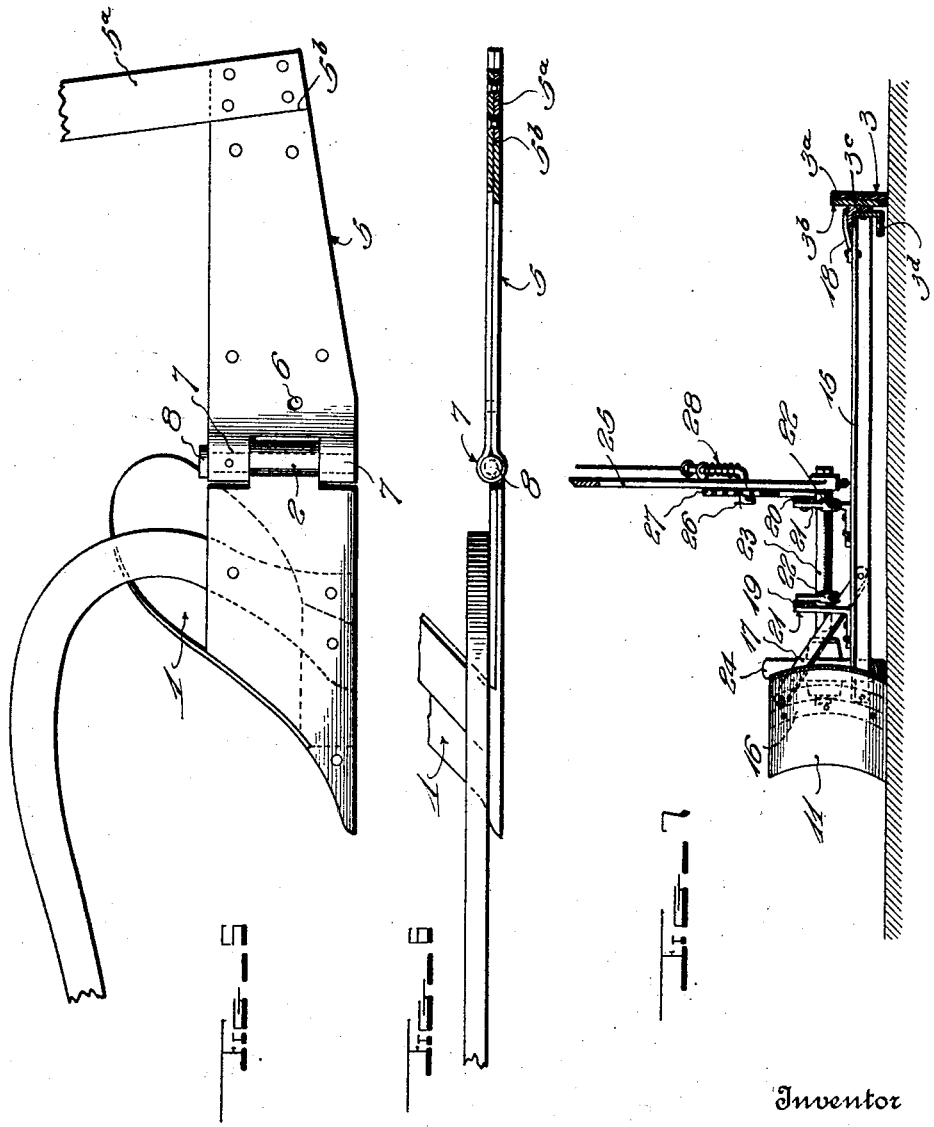

GEORGE A. BUCKLEY, OF ST. ANDREWS, WASHINGTON.

COMBINED PLOW AND SCRAPER.

1,409,826.　　　　Specification of Letters Patent.　　Patented Mar. 14, 1922.

Application filed April 23, 1920. Serial No. 376,123.

*To all whom it may concern:*

Be it known that I, GEORGE A. BUCKLEY, a citizen of the United States, residing at St. Andrews, in the county of Douglas and State of Washington, have invented certain new and useful Improvements in Combined Plows and Scrapers; and I do declare the following to be a full, clear, and exact description of the invention, such as will enable others skilled in the art to which it appertains to make and use the same.

This invention relates to a combined plow and scraper, and more specifically to an improved road grader and ditcher.

One object of this invention is to generally improve upon devices of this character, especially upon the device described in my copending application Serial No. 295,529, filed May 8th, 1919, by providing a vertical pivot for the plow, adjacent to its horizontal pivot, so that the two pivots provide, in effect, a universal joint between the plow and the scraper; it being a further object to standardize the parts of the device so as to minimize the cost of manufacture while providing a structure that is exceedingly strong, durable, rigid, convenient, effective, and practical.

Other objects and advantages will be pointed out or implied in the following details of description in connection with the accompanying drawings, in which;

Fig. 1 is a top plan view.

Fig. 2 is a detail view, parts being broken away, other parts being in horizontal section.

Fig. 3 is a left side elevation.

Fig. 4 is a vertical sectional view, the section being taken substantially along the line 4—4 of Figure 1.

Fig. 5 is an enlarged detail view, partly in elevation and partly broken away, showing the adjusting lever and the plow pivotally connected thereto.

Fig. 6 is a detail view, partly in horizontal section, illustrating the structure shown in Fig. 5.

Fig. 7 is a vertical sectional view, the section being taken substantially along the line 7—7 of Fig. 1.

Referring to these drawings in detail, in which similar reference characters correspond with similar parts throughout the several views, and in which the plow 1 may be of any ordinary construction, except that its landside is provided with a hinge-element or pivot-bearing 2, as illustrated in Fig. 5, the invention comprises this hinge-element and other elements which will now be specifically described as follows:

A longitudinally slidable runner or beam 3 is provided with a hinge-element or pivot-bolt 4, which combines with the hinge-element 2 and lever 5 to pivotally connect the plow to the runner, the axis of this bolt being horizontal as illustrated. The runner has a bifurcated front end which is apertured to receive the pivot 4, and the space between the furcations of this runner receives the substantially horizontal lower portion of a lever 5, which is provided with a pivot-bearing or aperture 6 through which the pivot 4 extends. The front end of the lever 5 is provided with a pivot-bearing or hinge-element 7 which combines with the hinge-element 2 and with a vertical pivot or pintle 8 to form a hinge-connection between the plow or lever 5. The lever 5 forms a close working fit with the furcations of the runners 3, and is adjustable about this horizontal pivot by means such as described in the copending application above referred to, that is, the upwardly extending portion $5^a$ of the lever 5 is pivotally connected to a link 9, and the latter is pivotally connected to a lever 10, the latter being manually operable for adjusting the lever 5 and thereby adjusting the plow with relation to the runner 3. The lever 5 is preferably of the form illustrated, that is, the portions 5 and $5^a$ (in Fig. 5) are formed separately of relatively thin and wide blanks of sheet metal and afterward riveted to one another. Moreover, the lower portion of this lever is preferably folded upon itself, as shown in Fig. 1 and has its contiguous portions riveted to one another, one of these portions being shorter than the other, so as to form a shoulder $5^b$ against which the member $5^a$ is seated.

The runner is preferably formed of four primarily separate pieces or beams of metal, as shown in $3^a$, $3^b$, $3^c$, and $3^d$, respectively, these parts being bolted, riveted or otherwise secured together so as to form a rigid unitary structure, bolts being preferable for this purpose, so that the members which are subject to the greatest wear, viz., the outer bar $3^a$ and the shoe $3^d$ can be removed and replaced with comparative ease and facility without disturbing the remaining elements of the device. The relatively thin and wide bars 3ᵃ and 3ᵇ have their major sides disposed in substantially vertical planes, respectively, and the shoe 3ᵈ co-acts with the plow 1 for preventing the lower edges of these plates from cutting unduly into the ground. The members 3ᶜ and 3ᵈ are preferably formed of angle-beams and the latter is preferably secured to the former, as more clearly shown in Fig. 7, while the beam 3ᶜ has one of its flanges parallel with and secured directly against the inner side of the bar 3ᵇ, the other flange of this beam 3ᶜ extending inward toward a scraper-blade 11 which has its front end secured to a lateral extension 12 of the front end of the bar 3ᵇ.

Front, intermediate and rear main braces 13, 14 and 15, extend from the runner to the scraper-blade, and each of these members has one end secured to the angleiron 3ᶜ by bolts and rivets, while the other end is secured to one of three angleirons 16 which extend transversely of the scraper-blade and are secured thereto by bolts or rivets. Each angleiron 16 extends from the top of the scraper-blade to a portion between its longitudinal center and bottom, and the main braces 13, 14 and 15 are riveted or bolted to the lower edge of the arcuate angleirons 16. Supplemental braces 17 have their upper ends riveted or bolted to the upper ends of the angleirons 16, while the lower ends of these supplemental braces are bolted or riveted to the intermediate portions of the respective main braces 13, 14 and 15. By referring to Fig. 7, it will be seen that each of the main braces 13, 14 and 15, is provided with a reinforcing plate 18, and that each of these plates is seated upon the upper surface of the angleiron or beam 3ᶜ, while the contiguous end of the main-brace extends under and is seated against the lower surface of the upper or inwardly extending flange of the beam 3ᶜ.

Two supporting bars 19 and 20 have their front ends secured to the scraper 11, and their rear ends are supported by uprights 21 which are bolted or riveted to the main brace 15. Bearings or hangers 22 depend from these bars 19 and 20, and the shaft 23 is journaled in these bearings. This shaft is provided with a radial-arm 23ᵃ on which is mounted a ground-wheel 24. The shaft or axle 23 is also provided with an arm or handle-bar 25, the latter being preferably removably secured on a non-cylindrical end of the shaft 23. The arm or hand-lever 25 is provided with a latch 26 which is normally held in engagement with a rack or segment 27 by means of a spring 28. The latch 26 can be operated by the ordinary means illustrated, or by other appropriate means. The ground-wheel is located in rear of the scraper-blade, so that it travels on the leveled or scraped surface and thereby causes the machine to remain level while moving forward.

A toothed segment 29 is provided for the lever 10, and the lever is provided with a spring-pressed latch similar to that indicated at 26—28. The segment 29 is preferably formed integrally with a pair of uprights which are secured directly to the runner 3, as indicated in Fig. 3, while the lever 10 is pivoted directly to this runner.

In operating this device, it will be seen that the plow is free to turn rightward or leftward, and thereby guides the device horizontally, and that the depth of plowing is regulated by the lever 10, as in my prior device. The lever 25 is actuated for raising and lowering the scraper-blade 11, through the medium of the wheel 24 and its adjuncts, and when the levers 10 and 25 are secured to their rearmost positions, the plow and scraper are both out of operation, and the device can be pulled from place to place without plowing or scraping.

It is not intended to limit this invention to the exact details shown and described, but changes may be made within the scope of the inventive ideas as implied and claimed.

What I claim as my invention is:

1. In a combined plow and scraper, a runner, a scraper-blade secured to said runner, a lever pivoted to said runner on a horizontal axis, and a plow pivoted to said lever on a vertical axis, said lever having an arm extending up from said runner and being operable to angle the plow with relation to said runner.

2. In a combined plow and scraper, a runner, a scraper-blade secured to said runner, a lever pivoted to said runner on a horizontal axis, and a plow having the rear end of its landside formed with a hinge-element having a vertical axis, said lever having at its front end a hinge-element which is united with that of said landside to pivotally secure said plow to said lever in such position that the outer face of said landside can be swung into and out of alinement with that of said lever.

3. In a device of the character described, a runner including bars disposed longitudinally in a vertical plane and secured in face to face contact throughout the greater portion of the length of the runner, the forward end portions of the bars being positioned in spaced relation, a scraping blade connected with the forward end portion of the inner one of said bars, bracing means for the scraping blades connected with said runner, a lever pivotally mounted between the spaced forward end portions of said bars for swinging movement, a plow pivotally connected with the forward end of said lever for horizontal swinging movement, and means for adjusting the lever vertically and releasably holding the lever in a set position.

4. In a combined plow and scraper, a runner including a relatively thin and wide bar disposed with one edge down and its main sides substantially vertical, a ground-engaging shoe at the rear end of said runner, said shoe being formed of an angle-beam and having one of its relatively broad surfaces presented to the ground while its other broad surface is parallel with and secured to said bar, a plow pivotally connected to said pivot-bearing.

In testimony whereof I have hereunto set my hand.

GEORGE A. BUCKLEY.